(12) United States Patent
Ferlitsch

(10) Patent No.: US 7,471,407 B2
(45) Date of Patent: Dec. 30, 2008

(54) SYSTEMS AND METHODS FOR MONITORING AN IMAGING JOB USING IMPLICIT ADDRESS DISCOVERY

(75) Inventor: Andrew R. Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 976 days.

(21) Appl. No.: 10/602,419

(22) Filed: Jun. 24, 2003

(65) Prior Publication Data

US 2004/0263898 A1 Dec. 30, 2004

(51) Int. Cl.
*G06K 1/00* (2006.01)
*G06F 15/00* (2006.01)

(52) U.S. Cl. .................. 358/1.15; 358/1.13; 358/1.14

(58) Field of Classification Search .................. 358/1.1, 358/1.9, 1.11–1.18, 2.1, 434, 437, 439, 468; 379/100.06; 399/11, 18, 21, 23
See application file for complete search history.

(56) References Cited

U.S. PATENT DOCUMENTS

| | | | |
|---|---|---|---|
| 5,898,823 A * | 4/1999 | Sorkin et al. ............... | 358/1.15 |
| 6,219,151 B1 | 4/2001 | Manglapus | |
| 6,452,689 B1 | 9/2002 | Srinivasan | |
| 6,452,692 B1 | 9/2002 | Yacoub | |
| 6,469,796 B1 * | 10/2002 | Leiman et al. ............. | 358/1.15 |
| 6,519,048 B1 * | 2/2003 | Tanaka ...................... | 358/1.13 |
| 6,728,001 B1 * | 4/2004 | Lee ............................ | 358/1.15 |
| 7,113,298 B2 * | 9/2006 | Mochizuki ................. | 358/1.15 |
| 2002/0001104 A1 | 1/2002 | Shima | |
| 2002/0030850 A1 | 3/2002 | Matsueda | |
| 2002/0057449 A1 | 5/2002 | Chapman et al. | |
| 2002/0095508 A1 | 7/2002 | Okazawa | |

FOREIGN PATENT DOCUMENTS

JP 2000020270 1/2000

* cited by examiner

*Primary Examiner*—Dov Popovici
*Assistant Examiner*—Thierry L Pham
(74) *Attorney, Agent, or Firm*—Madson & Austin

(57) ABSTRACT

A system for monitoring an imaging job and for implicit network address discovery is disclosed. The system includes a computing device and an imaging device in electronic communication with the computing device. Executable instructions on the imaging device are configured to receive the imaging job sent to the imaging device. An implicit network address is discovered from the imaging job without using an explicit address embedded in the imaging job. The imaging job is started at the imaging device. A status message for the imaging job is sent to the network address.

26 Claims, 13 Drawing Sheets

SYSTEMS AND METHODS FOR MONITORING AN IMAGING JOB USING IMPLICIT ADDRESS DISCOVERY

TECHNICAL FIELD

The present invention relates generally to printing through use of a computer. More specifically, the present invention relates to systems and methods for monitoring an imaging job using implicit address discovery.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Printers are used with computers to print various kinds of items including letters, documents, pictures, etc. Many different kinds of printers are commercially available. Ink jet printers and laser printers are fairly common among computer users. Ink jet printers propel droplets of ink directly onto the paper. Laser printers use a laser beam to print.

Printers are a type of imaging device. Imaging devices include, but are not limited to, physical printers, multi-functional peripherals, a printer pool, a printer cluster, a fax machine, a plotter, a scanner, a logical device, a computer monitor, a file, etc.

Different kinds of computer software facilitate the use of imaging devices. The computer or computing device that will be used to print the materials typically has one or more pieces of software running on the computer that enable it to send the necessary information to the printer to enable printing of the materials. If the computer or computing device is on a computer network there may be one or more pieces of software running on one or more computers on the computer network that facilitate printing.

In certain computing environments, it is desirable to receive information back from the imaging device that relates to each imaging job. The information that is tracked may be used for a variety of reasons including, but not limited to, knowing whether the imaging job was successful or if it had any problems. If there were any problems with the imaging job, receiving information about the problems may enable the computing device to perform corrective action or job recovery. Benefits may be realized by providing increased functionality to the software used in processing imaging jobs.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

Figure 1:
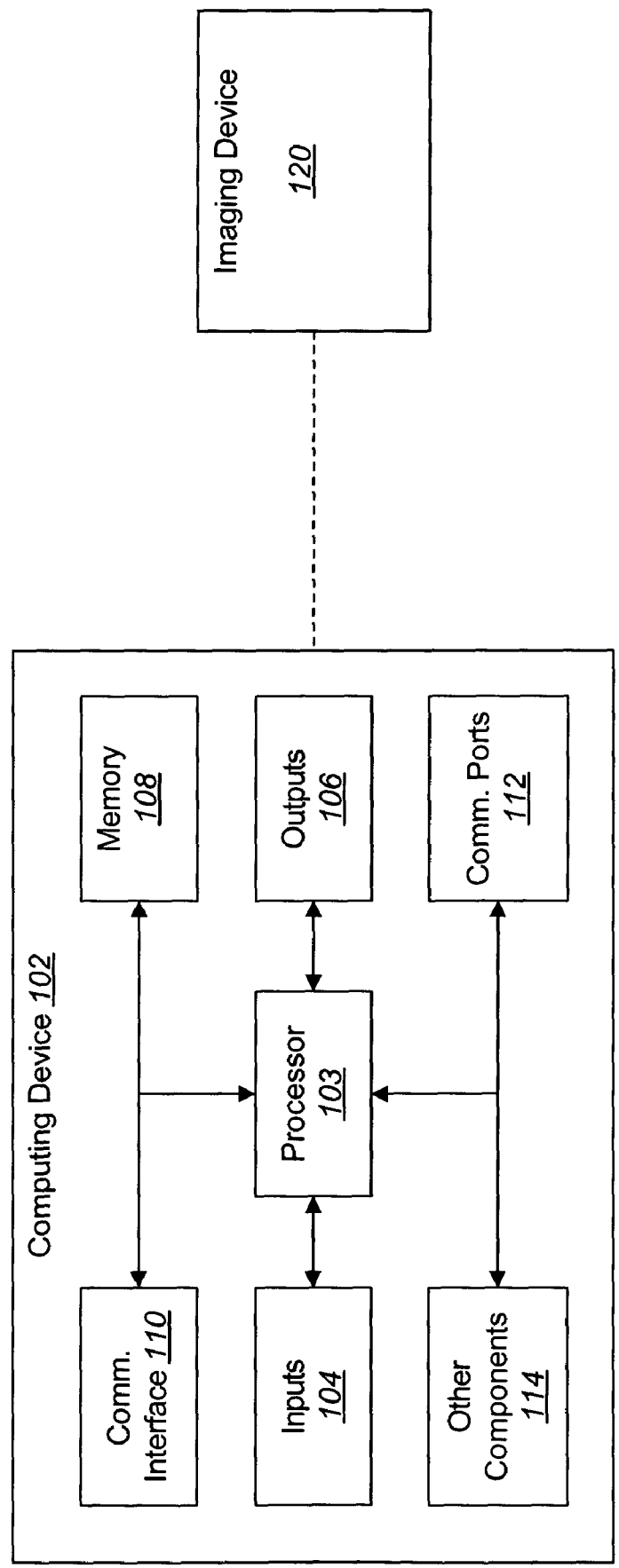
FIG. 1 is a block diagram illustrating the major hardware components typically utilized in a computing device used with embodiments herein.

A method for monitoring an imaging job sent to an imaging device being used by a computer system is disclosed. An imaging job is sent to an imaging device. The imaging job is received at the imaging device. An implicit network address is discovered from the imaging job. The imaging job is started at the imaging device. A status message is sent for the imaging job to the network address. The status message may be received by a client computing device.

In an embodiment, discovering the implicit network address may be achieved without using an explicit address of a monitoring process embedded in the imaging job.

Certain embodiments may verify that the imaging job of the status message originated on the client computing device. Whether the imaging job was communicated through the imaging server may also be verified.

The imaging device may be any kind of device for imaging including, but not limited to, a printer, a scanner, a fax machine, a copier and a document server. Many different kinds of protocols may be used for communications between the computing device and the imaging device. The imaging server may be any kind of imaging server device including, but not limited to, a print server, a fax server, a scan server and a document server.

A registration process may be used for registering a client computing device with an imaging server to receive notifications regarding the imaging job. Registering the client computing device with the imaging server includes providing a client computing device address to the imaging server.

The imaging job may be sent from the client computing device to the imaging server before the imaging job is sent to the imaging device.

The status message may be received by the imaging server and sent from the imaging server to the client computing device. A monitor on a client computing device may receive the status message. A server monitor on the imaging server may receive the status message.

A set of executable instructions for implementing a method for monitoring an imaging job and for implicit network address discovery is also disclosed. An imaging job is received at the imaging device. An implicit network address is discovered from the imaging job without using an explicit address embedded in the imaging job. An imaging job is started at the imaging device. A status message is sent for the imaging job to the network address.

The set of executable instructions may be stored on a computer-readable medium. The computer-readable medium may be part of a printer, a scanner, a fax machine, a document server, etc.

An imaging server configured to implement a method for monitoring an imaging job for use with an imaging device that utilizes implicit network address discovery is also disclosed. The imaging server includes a computing device and an imaging device in electronic communication with the computing device. Executable instructions on the computing device may be configured to implement a method that includes allowing a client computing device to register with the imaging server to receive notifications regarding an imaging job and receiving the imaging job from the client computing device. The method may further include sending the imaging job to the imaging device, wherein the imaging device discovers an implicit network address from the imaging job and sends a status message for the imaging job to the network address. Discovering of the implicit network address is achieved without using an explicit address in the imaging job. A status message may be received from the imaging device relating to the imaging job. The registration information may be used to identify the client computing device. The status message may be sent to the client computing device.

A system for monitoring an imaging job and for implicit network address discovery is disclosed. The system includes a computing device and an imaging device in electronic communication with the computing device. Executable instructions on the imaging device are configured to receive the imaging job sent to the imaging device. An implicit network address is discovered from the imaging job without using an explicit address embedded in the imaging job. The imaging job is started at the imaging device. A status message for the imaging job is sent to the network address.

It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

FIG. 1 is a block diagram illustrating the major hardware components typically utilized with embodiments herein. The systems and methods disclosed may be used with a computing device 102 and an imaging device 120. Computing devices 102 are known in the art and are commercially available. The major hardware components typically utilized in a computing device 102 are illustrated in FIG. 1. A computing device 102 typically includes a processor 103 in electronic communication with input components or devices 104 and/or output components or devices 106. The processor 103 is operably connected to input 104 and/or output devices 106 capable of electronic communication with the processor 103, or, in other words, to devices capable of input and/or output in the form of an electrical signal. Embodiments of devices 102 may include the inputs 104, outputs 106 and the processor 103 within the same physical structure or in separate housings or structures.

The electronic device 102 may also include memory 108. The memory 108 may be a separate component from the processor 103, or it may be on-board memory 108 included in the same part as the processor 103. For example, microcontrollers often include a certain amount of on-board memory.

The processor 103 is also in electronic communication with a communication interface 110. The communication interface 110 may be used for communications with other devices 102. Thus, the communication interfaces 110 of the various devices 102 may be designed to communicate with each other to send signals or messages between the computing devices 102.

The computing device 102 may also include other communication ports 112. In addition, other components 114 may also be included in the electronic device 102.

Of course, those skilled in the art will appreciate the many kinds of different devices that may be used with embodiments herein. The computing device 102 may be a one-chip computer, such as a microcontroller, a one-board type of computer, such as a controller, a typical desktop computer, such as an IBM-PC compatible, a Personal Digital Assistant (PDA), a Unix-based workstation, etc. Accordingly, the block diagram of FIG. 1 is only meant to illustrate typical components of a computing device 102 and is not meant to limit the scope of embodiments disclosed herein.

The computing device 102 is in electronic communication with the imaging device 120. Imaging devices include, but are not limited to, physical printers, multi-functional peripherals, a printer pool, a printer cluster, a fax machine, a plotter, a scanner, a logical device, a computer monitor, a file, an electronic whiteboard, a document server, etc. Imaging devices are well known by those skilled in the art.

In light of the definition of an imaging device 120 above, the term imaging job, as used herein, is broadly defined as any instruction or set of instructions that are sent to an imaging device to cause an image to be printed, imaged, scanned, sent, etc., to or from the imaging device 120. Thus, the term imaging job includes, but is not limited to, a fax instruction or job to send a fax, a print job to print to a file, a print job to print to a particular window in a graphical user interface, a scan job to scan in an image from a scanner, a print job to print to a physical printer, etc.

When a print job is printed from a computing device 102 to a digital imaging device 120, or a scan job is scanned from a digital imaging device 120 to a computing device 102, or a fax job is sent from/to a digital imaging device 120, or a document job is sent/retrieved to/from a document server, through a print/scan/fax/document subsystem, an error could occur prior to the completion of the job on the recipient side without the error being reported back to the sender and without the opportunity for the sender to take corrective action. The systems and methods herein provide means by which the error may be reported back to the sender and embodiments also provide opportunities for the sender to take corrective action.

Traditionally, the print subsystem on a computing system, such as illustrated by the Microsoft Windows family of operating systems, only monitors portions, but not all, of the process of printing an image on paper to a peripheral device. For example, in the Microsoft Windows family of operating systems, a user typically prints a document by opening the document in an associated application and selecting File->Print. The application then converts the document data to a device independent format (i.e., GDI for Graphics Device Interface) and passes the device independent data to the printer driver associated with selected printer. The printer driver then converts (i.e., rendering) the device independent data to device dependent format (e.g., PCL, Postscript) that is compatible with the printing device. The device dependent data (i.e., print data) is then spooled to the print spooler and the print spooler places the print data in storage for subsequent despooling to the printing device.

The process of spooling and despooling the print data are typically separate processes. In this manner, the printer driver can return control back to the user's application after the print data has been spooled by the spooler without waiting for the print data to be printed on the printer. If an error occurs prior to the completion of the spooling of the print data, the error would be propagated back to the driver/application and the user could take corrective action, if any.

The print spooler then, immediately or delayed, despools the print job to the print processor. If the print job is journaled data (e.g., EMF—Enhanced Metafile Format), the print processor will playback the print data to the corresponding printer driver, which will render the journaled data and respool the render print job to the print spooler. Otherwise, the print processor will despool the rendered print data to the corresponding printing device. In some print subsystems, a customized print processor may be used to performed proprietary actions related to the print job as well as the standard behavior.

If an error occurs despooling the print data from the spooler to the print processor, or when the print processor is despooling the print data to the printing device, or when the print processor is playing back the journaled data to the corresponding printer driver, that error is reported back to the print spooler.

Depending on the printing protocol (e.g., LPR), the port manager may not return control back to the print processor until the print job has been raster image processed (RIP) on the printing device. RIP stands for Raster Image Processed or Processor. A RIP is a process that takes imaging data (e.g., PDL) and converts it into a bitmap for printing. The print processor then returns control back to the print spooler, indicating to the print spooler that the print job has completed successfully, and the spooler deletes the scheduled print job and any associated resources (e.g., spool file). If an error occurs during the RIP process, this error is propagated, via the printing protocol and print processor, back to the print spooler.

If an error is reported back to the print spooler, the print spooler can notify the user and take corrective action, if any. For example, if the connection to the printing device during transmission of the print data timed out, the spooler might notify the user and ask the user if they like to retry. If so, the print job is again despooled by the print spooler. Other errors may cause the spooler to preserve the spool data and other associated job scheduling information and attempt to prompt the user at a later point for retry, such as after a system reboot.

Some custom print processors may also take corrective action in place of the print spooler. For example, this print processor may attempt to automatically rollover the print job to another available compatible printer that is part of the same printer pool (e.g., Sharp EZ Cluster®).

The traditional manner for monitoring and job recovery by the Microsoft Windows print subsystems continue to be deficient in the following ways. An error occurring after the print job is RIP'ed and is being printed, such as a paper jam, could be handled in a more efficient manner.

Improvements could also be made to assist when an error occurs after the print job is despooled from a print server (i.e., network printing) to a printing device. In a shared printing environment, where a print job is despooled to a print queue on a print server, the print server appears as the printing device to the local print processor. Thus, when the print job is successfully queued on the print server, the print job is reported back to the local print processor/spooler as successfully printed. If an error occurs after the print job is despooled from the print server to the printing device, such as a despooling or an RIP error, the error is reported back to the print processor/spooler on the print server. The print server spooler then has to take corrective action, which may not be reported back to the user (client) for intervention.

Error handling systems could also be modified for an error occurring after a print job is de-queued for printing from an internal queue in the printing device. This applies to printers that have capabilities to queue simultaneous jobs on the printer by storing the jobs to internal storage. The internal queue/storage operates as an internal print server/spooler.

Thus, when the job is successfully queued on the printer, the print job is reported back to the local print processor/spooler as successfully printed. If the error occurs during de-queuing or RIP, the error is reported back to the internal server/spooler. The printer then has to take corrective action, if any, which may not be reported back to the user (client) for intervention.

The network address of the local client may be embedded in the print job and a monitoring process may run in the background on the client machine. When the printer successfully outputs the print job, or detects an error, a message indicating the status of the job is sent back to the monitoring device on the local client machine, obtained from the network address embedded in the print job (e.g., Sharp Status Monitor®).

Job identification information or the network address of the local client may be embedded in the print job and a monitoring process may be running that listens and registers a document specific SNMP (Simple Network Management Protocol) trap with the device. When the printer successfully outputs the print job, or detects an error, an SNMP document specific message indicating the status of the job is sent back to the monitoring device on the local client machine, which registered the trap for the specified job/event.

In another embodiment, the email address of the user initiating the print job is embedded in the print job. When the printer successfully outputs the print job, or detects an error, an email message is sent back to the user. This method would lack several benefits. For example, the message is not real-time. The user also may need to poll the email server. Further, the email is not integrated with print spooler/subsystem. The print spooler may not be able to take corrective action. In addition, the print job would probably have already been deleted by the spooler. The user would most likely have to manually take corrective action, if any.

A custom print spooler may be used. A custom print spooler may be used to communicate with the printing device about the status of a print job after it has been despooled to the printing device. Two methods of communication may be used. In the first method, the print spooler periodically polls the printing device using SNMP. The printer is presumed to support a SNMP job MIB (Management Information Base) extension. During each poll, the print spooler queries the printing device for the OID (Object Identifier) values of a job MIB relating to the despooled job.

Using another method of communication the custom print spooler may register an SNMP trap with the printing device to respond back with job MIB events. When the job is completed, or the status otherwise changes, such as in a paper jam, the printing device would send a message back to the custom spooler.

When a print job is printed from a computing device to a digital imaging device, or a scan job is scanned from a digital imaging device to a computing device, or a fax job is sent from/to a digital imaging device or a document job is sent/retrieved to/from a document server, through a print/scan/fax/document subsystem, the physical completion of a job (e.g., output from a print job) may not be known at the job source.

Traditionally, the print subsystem on a computing system, such as illustrated by the Microsoft Windows family of operating systems, only reports on spooled jobs that have not been completely despooled to a printing device. For example, if a user sends 3 print jobs to a printer, the user might see the following through the local print monitor. When the first job is despooling from client to printer, the user might see the following:

Job 1 Printing
Job 2 Spooled
Job 3 Spooled

When the first job is fully despooled and the second job is despooling to the printer, the user might see the following:

Job 2 Printing
Job 3 Spooled

When the second job is fully despooled and the third job is despooling to the printer, the user might see the following:

Job 3 Printing

This type of monitoring system has one or more characteristics which may be seen as shortcomings in certain situations. For example, if an error occurs after the printer has acknowledged acceptance of a print job (e.g., fully RIP'ed or internally queued, or on hold queue for manual release), there is typically no record of the event reported back to the monitor. In addition, there is usually no monitoring of a print job that is not spooled through the print spooler, such as a direct submission of a printer ready file (e.g., prn, postscript, etc).

It is possible to embed the network address of the local client in the print job and run a monitoring process in the background on the client machine. When the printer successfully outputs the print job, or detects an error, a message indicating the status of the job may be sent back to the monitoring device on the local client machine, obtained from the network address embedded in the print job. While this method does allow the status of the current print job to be reported back to the user throughout the print job lifecycle, including interruption and resumption, until final paper out, this method has several characteristics. The IP address of the client is embedded in the print job. If a print job is submitted by a method that does not know about embedding the IP address, no notification is received. Such methods include third party drivers, direct submission of printer ready files, direct printing utilities and composite job builds. Finally, there is not a method for sending multiple copies of the job completion notice when there is more than one party expecting to receive the notification, such as a job accounting server.

The method mentioned above may be modified to include the use of an SNMP trap. The network address of the local client or job identification information is embedded in the print job and a monitoring process is ran listening which registers a document specific SNMP trap with the device. When the printer successfully outputs the print job, or detects an error, an SNMP document specific message indicating the status of the job is sent back to the monitoring device on the local client machine, which registered the trap for the specific job or event. The method may also insert multiple embedded origination commands into the print data for purposes such as: a second network address of an accounting server to send accounting information to, page or other sub-job completion notice, and addresses of other data source to merge into the print job, such as scan image data. This method has several characteristics. The local client needs to be able to register the SNMP trap with the device. The IP address of the client needs to be embedded in the print job. Finally, if a print job is submitted by a method that does not know about embedding the IP address, no notification is received. Such methods include third party drivers, direct submission of printer ready files, direct printing utilities and composite job builds.

Electronic mail may also be used for automatically communicating returning status and information from a printer. The email address of the user initiating the print job may be embedded in the print job. When the printer successfully outputs the print job, or detects an error, an email message is sent back to the user. There are several characteristics of this email method. The message is not real-time. The user needs to poll the email server. In addition, the email address of the user needs to be embedded in the print job. If a print job is submitted by a method that does not know about embedding the email address, no notification is received. Such methods include third party drivers, direct submission of printer ready files, direct printing utilities and composite job builds. This simple method described did not include a method for sending multiple copies of the job completion notice when there is more than one party expecting to receive the notification, such as a job accounting server.

In another method, a job completion notification may be sent to more than one destination, such as an accounting server. In this method, a second job completion monitor runs on the print server and the print job is modified on the print server to change the embedded IP address of the client to the IP address of the server. The job completion notification from the printer is then sent to the job monitor on the print server. The job completion monitor on the server then sends copies of the notifications to multiple destinations, including the client. With this method, the IP address of the client is still embedded in the print job. If a print job is submitted by a method that does not know about embedding the IP address, the print server cannot echo a job notification to the client. Such methods include third party drivers, direct submission of printer ready files, direct printing utilities and composite job builds.

Systems and methods are disclosed herein for job completion notification via implicit IP address discovery. These systems and methods do not need the network address of the client and/or the user to be embedded into the print job. For example, with peer-to-peer printing, a Multi-Functional Peripheral ("MFP") may extract the client IP address from the IP address associated with the transmission of the print job data packets. With network printing, the MFP may extract the server IP address and send notifications to the server. The server may then unicast messages to each registered client.

No network address needs to be entered into the MFP and/or print server for a third party to receive a copy of the notification. With respect to network printing, third parties may register as a client with the server. The server then sends a unicast copy of the message to the third party client.

The systems and methods herein may be compatible with existing solutions that embed the IP address in the print job. If a client IP address is embedded in print job, server attempts to locate the client can be disabled. Further, if there is a command embedded to disable job notification, this method can also be disabled.

Herein references to jobs performed by a multi-functional peripheral ("MFP"), such as printing, scanning, faxing, copying and document management, will be referred to as imaging jobs. In addition, references to devices that receive or transmit an imaging job, such as an MFP or computing device, will be referred to as imaging devices. Print jobs and printing devices are used to illustrate exemplary embodiments, but other kinds of imaging jobs and imaging devices may be used in implementations of the embodiments disclosed herein.

References to computing devices that construct and despool an imaging job to either an imaging device or server, will be referred to as client computing devices (i.e., client). Herein, reference to computing devices that centrally manage a shared imaging device by receiving despooled imaging jobs from multiple client computing devices and re-despools the imaging job to the imaging device, will be referred to as server computing devices (i.e., server).

The embodiments disclosed operate independently of how the imaging job is initiated. For example, a print job may be initiated by an application using a printer driver which spools a print job to the print spooler. By way of further example, the print job may be initiated by direct printing using a utility that generates a print job ticket and despools the document data and job ticket directly to the printer.

The embodiments disclosed also operate independently of the protocol used between the client computing and imaging device to obtain the job completion status. For example, the protocol may be a proprietary protocol over TCP/IP. Although Sharp's proprietary NJR (notify job return) protocol over TCP/IP will be used to illustrate the various embodiments, other protocols may also be used.

Figure 2:
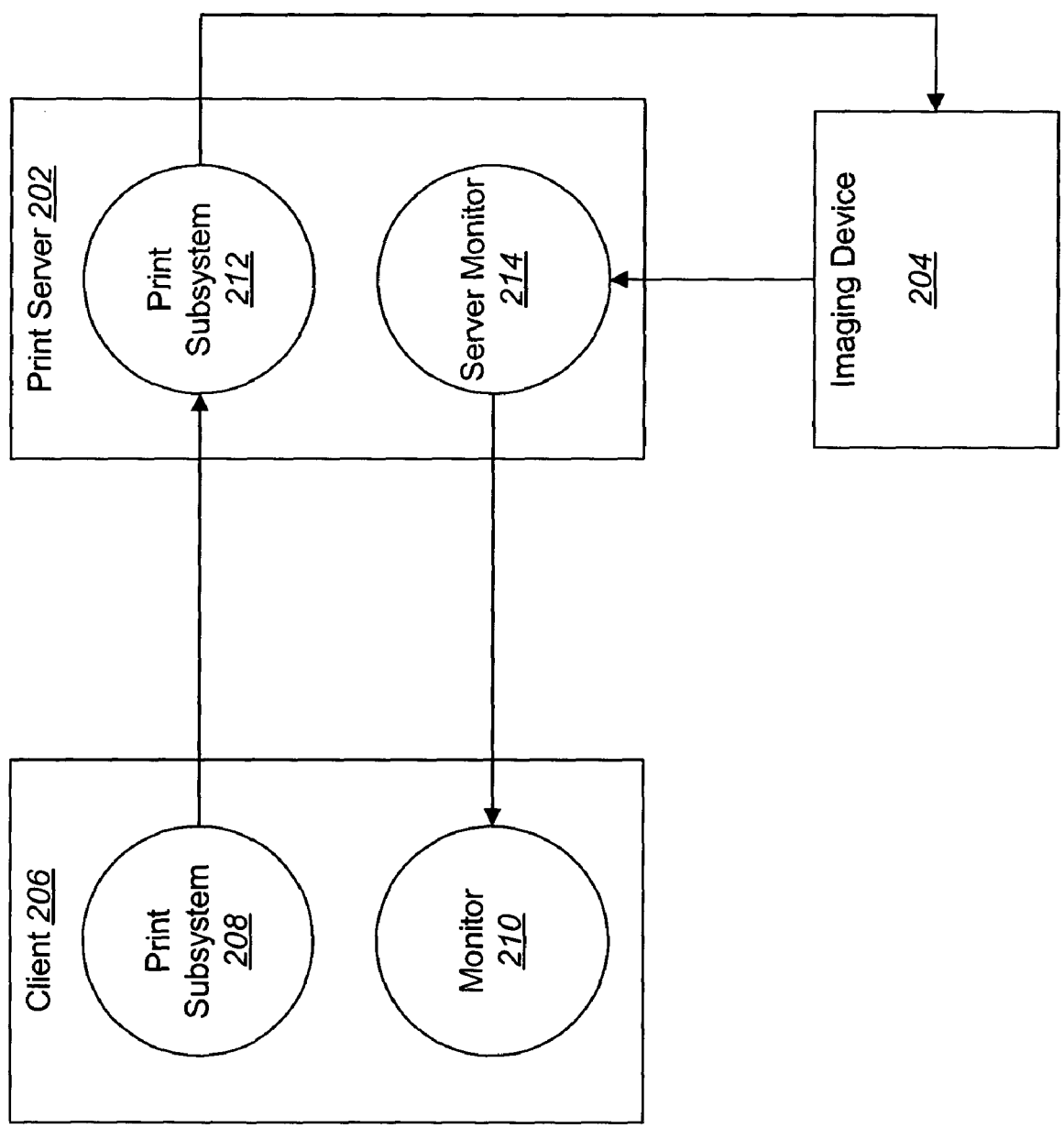
FIG. 2 is a general block diagram of the system using a print server that sends imaging jobs to the imaging device.

FIG. 2 is a general block diagram of the system using a print server 202 that sends imaging jobs to the imaging device 204. The client computing device 206 sends imaging jobs to the print server 202. The client computing device has a print subsystem 208 for handling printing tasks and a monitor 210 for monitoring the status of imaging jobs. The print server 202 also has a print subsystem 212. The server monitor 214 runs on the print server 202 and monitors imaging jobs sent to the imaging device 204. The diagram of FIG. 2 illustrates network printing using a print server 202.

Figure 3:
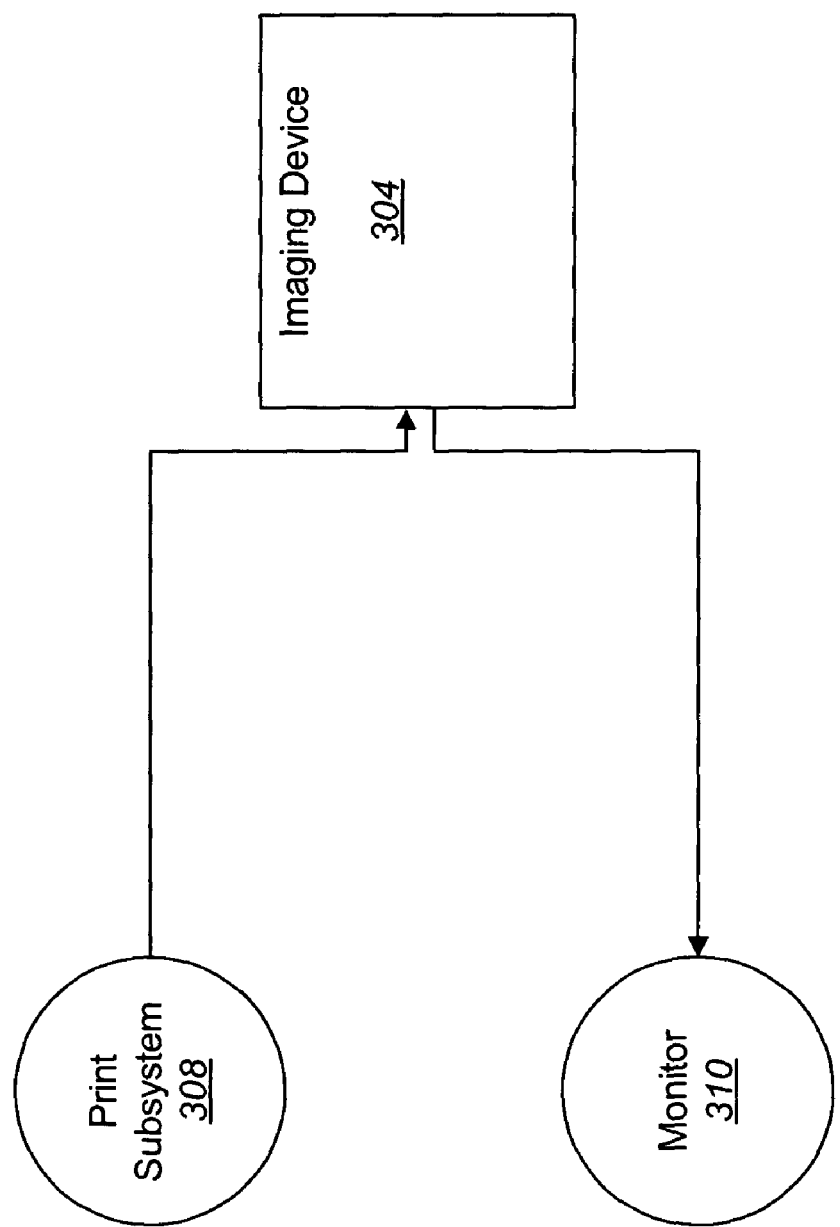
FIG. 3 is a block diagram of peer to peer printing without a print server.

FIG. 3 is a block diagram of peer to peer printing without a print server. The print subsystem 308 sends imaging jobs to the imaging device 304. Status messages are sent to the monitor 310 as disclosed herein.

Figure 4:
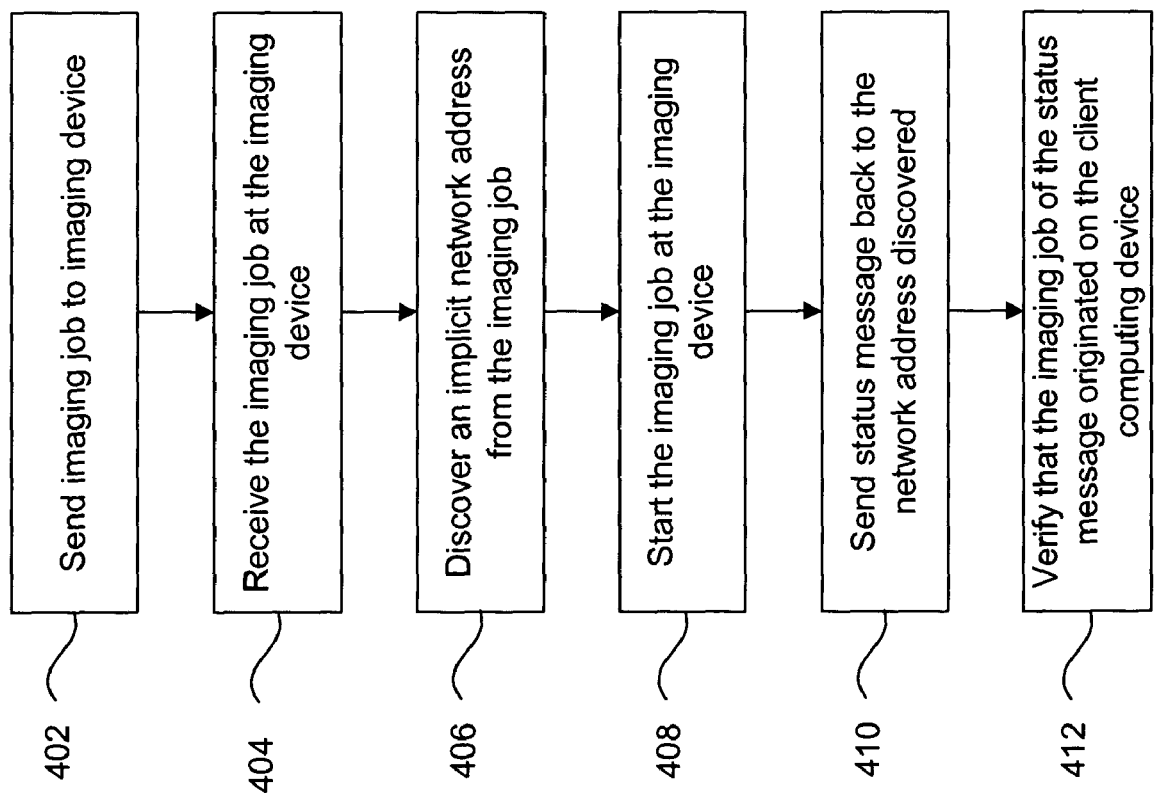
FIG. 4 is a flow diagram of a method for monitoring an imaging job sent to an imaging device being used by a computer system.

FIG. 4 is a flow diagram of a method for monitoring an imaging job sent to an imaging device being used by a computer system. The imaging job is sent 402 to the imaging device. The imaging job is received 404 at the imaging device. An implicit network address is discovered 406 from the imaging job. The imaging job is started 408 at the imaging device. A status message is sent 410 back to the network address discovered. When the status message is received, origination of the imaging job from the client computing device may be verified 412.

Figure 5:
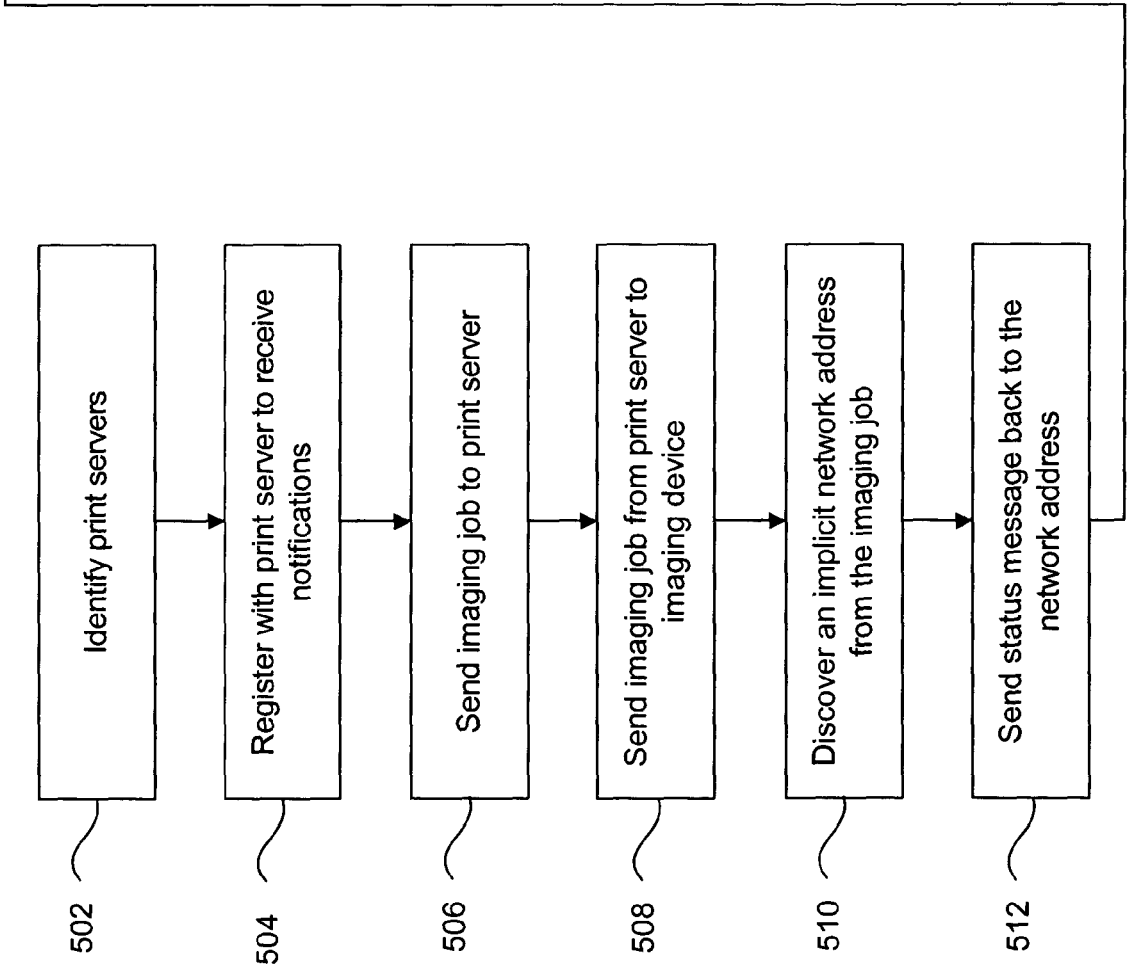
FIG. 5 is a flow diagram of a method for monitoring an imaging job sent to an imaging device being used in a network printing environment where a print server is being utilized.

FIG. 5 is a flow diagram of a method for monitoring an imaging job sent to an imaging device being used in a network printing environment where a print server is being utilized. The print servers may first be identified 502. Clients may register 504 with the print server to receive notifications about imaging jobs. The imaging job is sent 506 to the print server which in turn sends 508 the imaging job to the imaging device. An implicit network address is discovered 510 from the imaging job. A status message is sent 512 back to the network address discovered. When the status message is received 514 at the print server, it may be examined 516 to determine origination of the imaging job. The status message may be sent 518 to the client computing device from the print server.

FIGS. 4 and 5 are general flow diagrams that may be implemented in a variety of different configurations and embodiments. The diagrams of FIGS. 6-13 illustrate various embodiments and various steps being performed as exemplary implementations.

Figure 6:
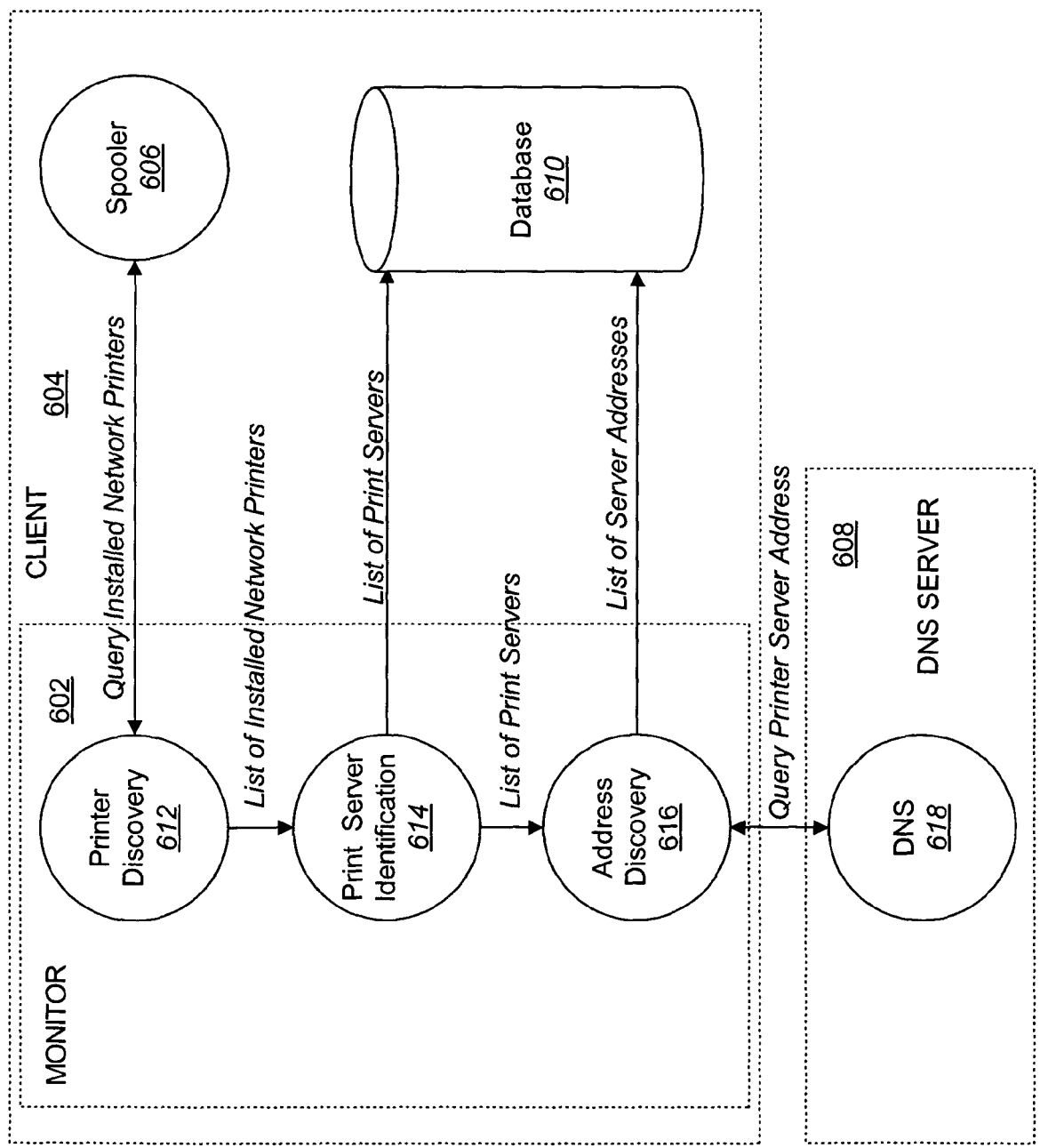
FIG. 6 is a block diagram illustrating an embodiment of the system during print server discovery.

FIG. 6 is a block diagram illustrating an embodiment of the system during print server discovery. In the embodiment in FIG. 6, a job completion monitoring process 602 runs on one or more client computing devices 604 and one or more print servers. The job completion monitoring process 602, herein referred to as monitor 602, on each client 604 locates the print servers associated with the client's installed network printers. For example, in the Microsoft Windows family of operating systems, the client monitor 602 may query the local spooler 606 to enumerate all installed printers that are network connected (i.e., connected via a print server).

For each printer enumerated, the client monitor 602 may obtain from the local spooler 606 corresponding printer information, such as a PRINTER_INFO_2 structure, for each enumerated printer. Part of the information obtained for each printer would include the printer's associated print server and print queue names. For example, the print server and queue name may be represented as \\<server>\<shared-printer-name>. In this example, the <server> is a DNS or WINS name associated with the print server and the <shared-printer-name> is the queue name set by the print server and exported out to the clients.

For each print server identified, e.g., <server>, the client monitor 602 determines the network address of the print server. In the preferred embodiment, the DNS name of the <server> was identified in the printer information obtained from the local spooler 606, and the network address is obtained by a DNS lookup of the DNS name of the server from a DNS Name Server 608.

The client monitor 602 may save the located print servers and corresponding network addresses (i.e., static) in a database 610. The monitor 602 may continuously refresh the information in the database 610 (i.e., dynamic) or refresh the information in response to specific events (i.e., cached).

Different tasks that may be performed by the monitor 602 are shown as processes within the monitor 602 and have been discussed above. The monitor 602 may perform printer discovery 612 to prepare a list of installed network printers. The monitor 602 may then perform print server identification 614 and address discovery 616. Information obtained may be stored in the database 610. As shown the DNS Server 608 includes a DNS process 618 that responds to requests during address discovery 616.

Figure 7:
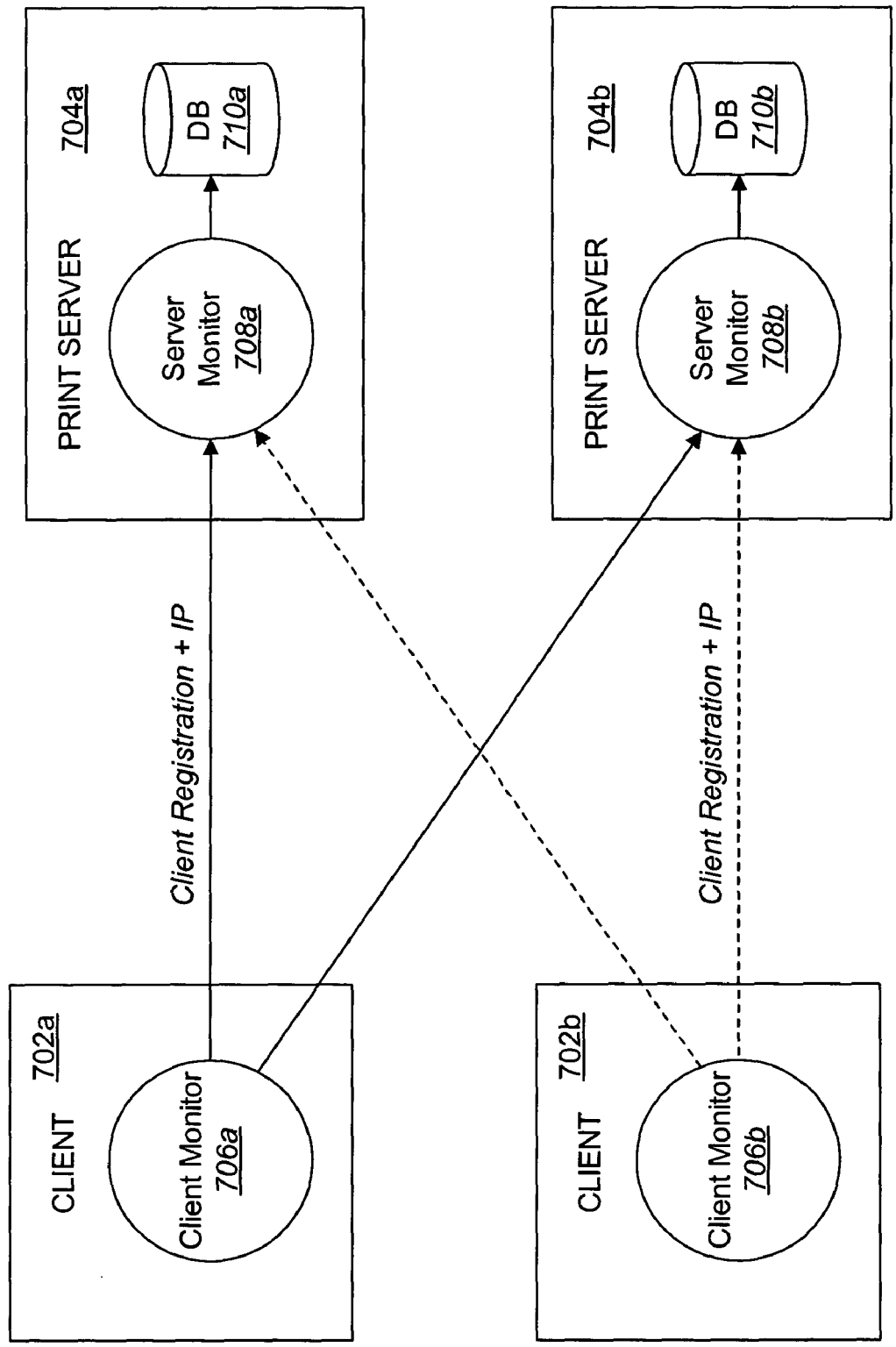
FIG. 7 is a block diagram of an embodiment used with network printing and illustrates the clients registering with the print servers.

FIG. 7 is a block diagram of an embodiment used with network printing and illustrates the clients registering with the print servers. Two clients 702 are shown and two print servers 704 are shown. As illustrated, each client 702 includes a monitor 706. Each print server 704 includes a server monitor 708 and a database 710 for storing information. The client monitor 706 performs a registration process with the server monitor 708 on each print server 704 located by the client monitor 706. In one embodiment, the located print servers 704 are the print servers 704 for which the client 702 has an installed network printer. The registration may include, but is not limited to, sending the following information: (a) the <shared-printer-name> of each installed network printer on the client 702, (b) the client's name (e.g., DNS), and (c) the client's network address (e.g., IP or MAC address).

In the embodiment illustrated in FIG. 7, the client monitor 706 may connect to the server monitor 708 using a network connection mechanism (e.g., TCP/IP) to the server's network address (e.g., IP address) and a port on the server 704 that the server monitor 708 will be listening to. Likewise, the server monitor 708 is listening and processing messages that arrive at the port the server monitor 708 is listening to. The client monitor 706 then sends the registration as a message, using a data protocol, to the server monitor 708. In response, the server monitor 708 may optionally acknowledge receipt of the message (i.e., handshake) and success/failure status of the registration request. The server monitor 708 stores the client registration information, such as in a file, registry or database.

In a multi-client, multi-print server environment, each client monitor 706 may register with more than one server monitor 708 and each server monitor 708 may have more than one client monitor 706 registration.

Figure 8:
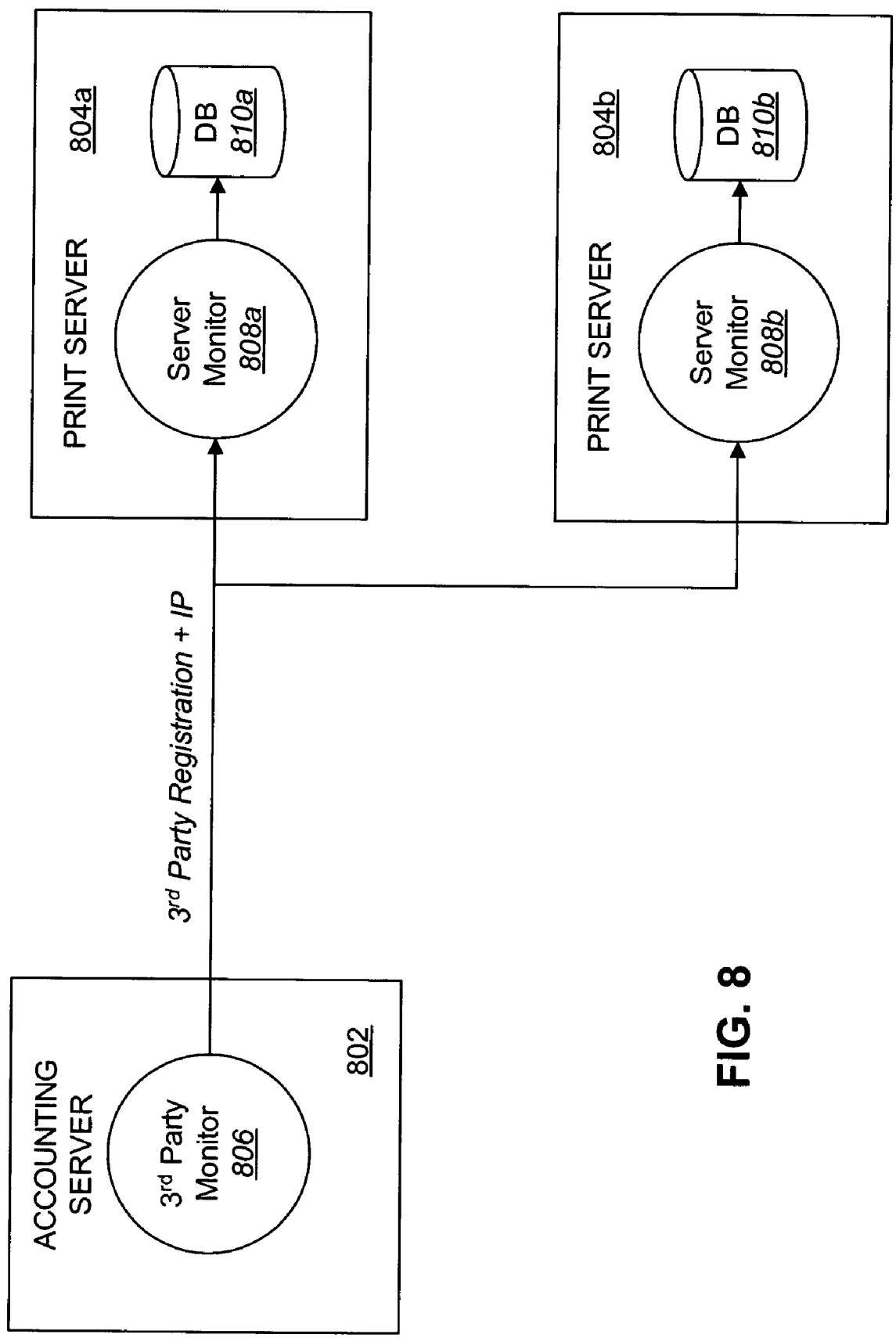
FIG. 8 is a block diagram of an embodiment showing a third party device or system registering with one or more print servers.

FIG. 8 is a block diagram of an embodiment showing a third party device or system 802 registering with one or more print servers 804. A third party monitor 806, such as an accounting server 802, may also register with one or more print server monitors 808. The registration may include, but is not limited to, sending the following information: (a) the third party name (e.g., DNS), (b) the third party network address (e.g., IP or MAC address), (c) zero or more shared printer names of network printers on the print server, and (d) zero or more client names and/or network addresses.

Figure 9:
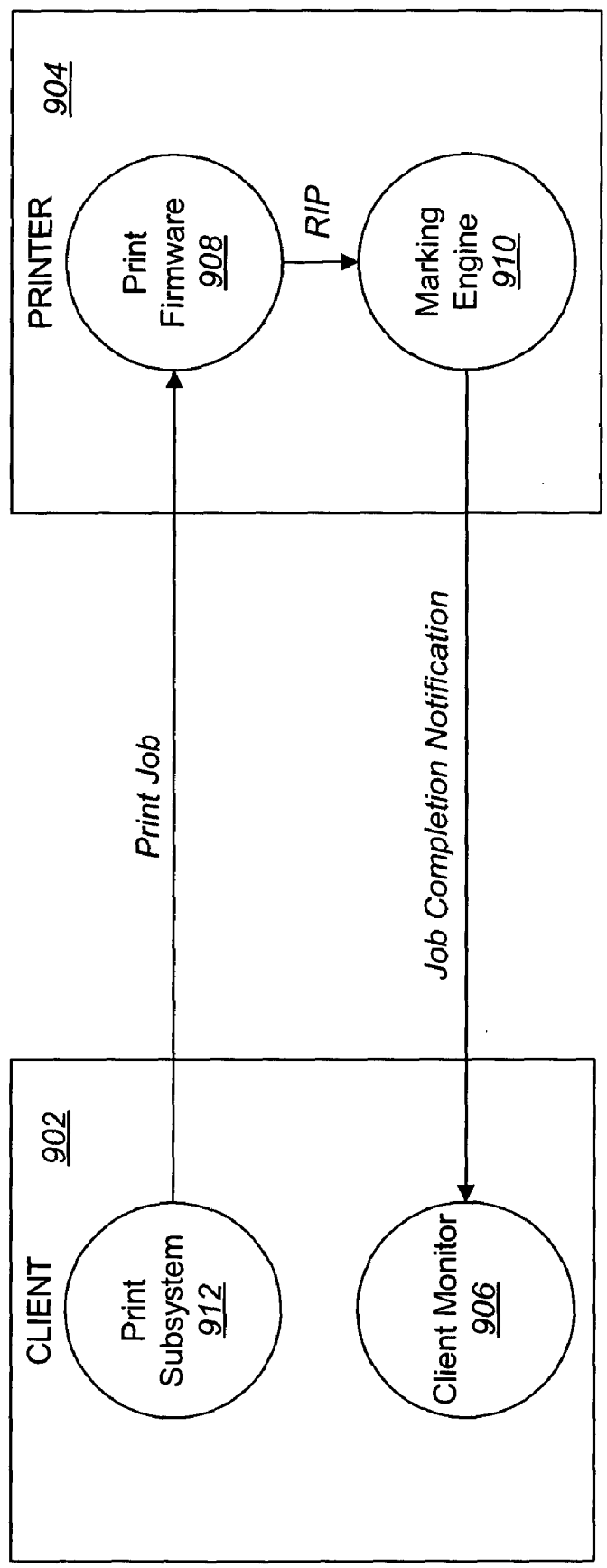
FIG. 9 is a block diagram of an embodiment of peer to peer printing where the job completion notification is sent to the client via an implicit client IP address.

FIG. 9 is a block diagram of an embodiment of peer-to-peer printing where the job completion notification is sent to the client 902 via an implicit client IP address. In this embodiment, the client computing device 902 despools a print job directly to the imaging device 904 (i.e., peer-peer printing), bypassing any print server, using its print subsystem 912. In this embodiment, the imaging device 904 (illustrated as a printer in FIG. 9) obtains the network address of the client 902 from the transmission packets despooled between the client 902 and imaging device 904. The imaging device 904 then sends job completion notifications directly to the job monitor 906 on the client computing device 902, via the extracted network address.

The imaging device 904 may send one or more job completion notifications per event. These events may include, but are not limited to:

1. Job being spooled to the device (e.g., print/fax).
2. Job being spooled from the device (e.g., scan).
3. Job spooled on the device (e.g., in queue).
4. Job pending to device (e.g., interactive pull print/fax from server/client).
5. Job in a held state (e.g., spooled but waiting for user interaction).
6. Job being processed on the device (e.g., printing/faxing/scanning).
7. Job in an interrupt state (e.g., out of paper, user intervention required).
8. Job canceled (e.g., user/device cancellation).
9. Job completed with problems (e.g., simplex output on a requested duplex job).
10. Job completed without problems (e.g., imaged as requested).

The job completion notification may include additional information to identify the imaging job, including, but not limited to:

1. Name of client origination (e.g., extracted from imaging job).
2. Name of user origination (e.g., extracted from imaging job).
3. Name of imaging job (e.g., extracted from spooler or imaging job).
4. Name of installed imaging device origination (e.g., extracted from imaging job).
5. Identification of the printing device, such as name, model and network address.

Upon receipt of the job completion notification, the client monitor 906 verifies the job completion notification is for an imaging job that originated on the client 902. If the job completion notification cannot be verified, then the notification may be ignored. Otherwise, the job completion notification is processed. In one example the client monitor 906 may format and display a message to the user on the client computing device 902, according to the contents of the job completion notification.

Printers 904 are well known in the art. Two components of the printer 904 are illustrated, print firmware 908 and a marking engine 910. Print firmware 908 operates in processing the imaging job. The marking engine 910 in a printer 904 causes the printing to occur which results in a printed document or paper.

Figure 10:
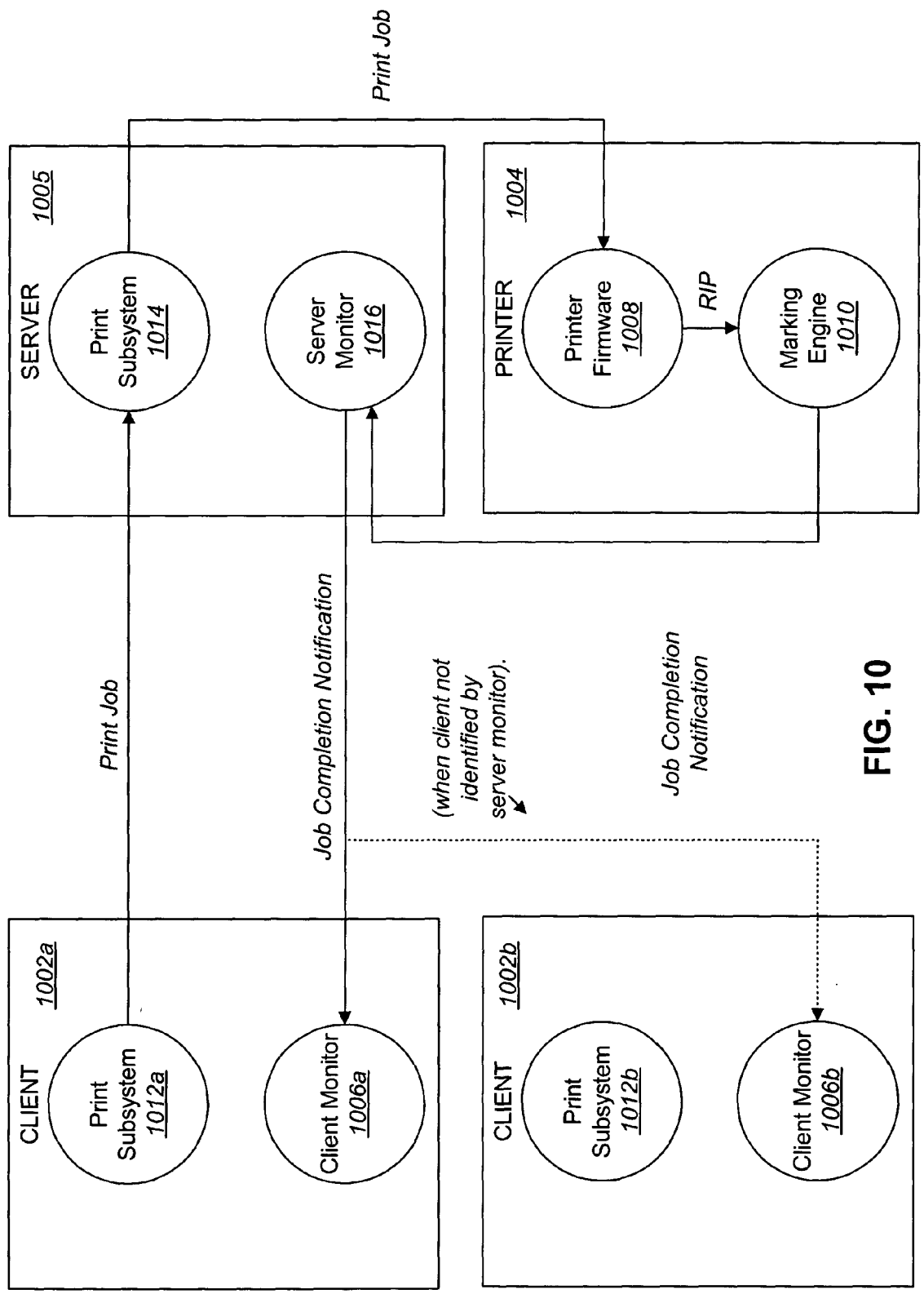
FIG. 10 is a block diagram of an embodiment of network printing (client to printer server) where the job completion notification is sent to the client by server echo via an implicit server IP address.

FIG. 10 is a block diagram of an embodiment of network printing (client to printer server) where the job completion notification is sent to the client by server echo via an implicit server IP address. In this embodiment, the print subsystem 1012a of the client computing device 1002a despools the print job to a print server 1005. The print server 1005 then despools the print job, immediately or delayed, to the imaging device 1004 using its print subsystem 1014. In this embodiment, the imaging device 1004 obtains the network address of the server 1005 from the transmission packets despooled between the server 1005 and imaging device 1004. The imaging device 1004 then sends job completion notifications (more generally referred to as status messages) to the job monitor 1016 on the server computing device 1005, via the extracted network address.

Upon receipt of the job completion notification, the server monitor 1016 examines the job completion notification to determine the client origination. If the server monitor 1016 is able to identify the client origination, the server monitor 1016 forwards the job completion notification to the client monitor 1006.

If the server monitor 1016 is unable to determine the client origination, the server monitor 1016 examines the job completion notification to determine the associated shared printer. For example, the network address of the transmission packets from the imaging device 1004 may be extracted and compared to the network addresses of each shared printer port to find a match. If the server 1005 is unable to identify the shared printer associated with the job completion notification, the job completion notification is ignored. Otherwise, the server 1005 identifies all the client monitors 1006 that have registered with the server monitor 1016 for the associated shared printer, and forwards the job completion notification to each client 1002.

The server monitor 1016 may also add additional information to the forwarded job completion notification, including, but not limited to:

1. The name of the print server.
2. The name of the shared printer on the print server (e.g., print queue).
3. The network address of the print server.

Upon receipt of the forwarded job completion notification, the client monitor(s) 1006 perform the actions described above.

Figure 11:
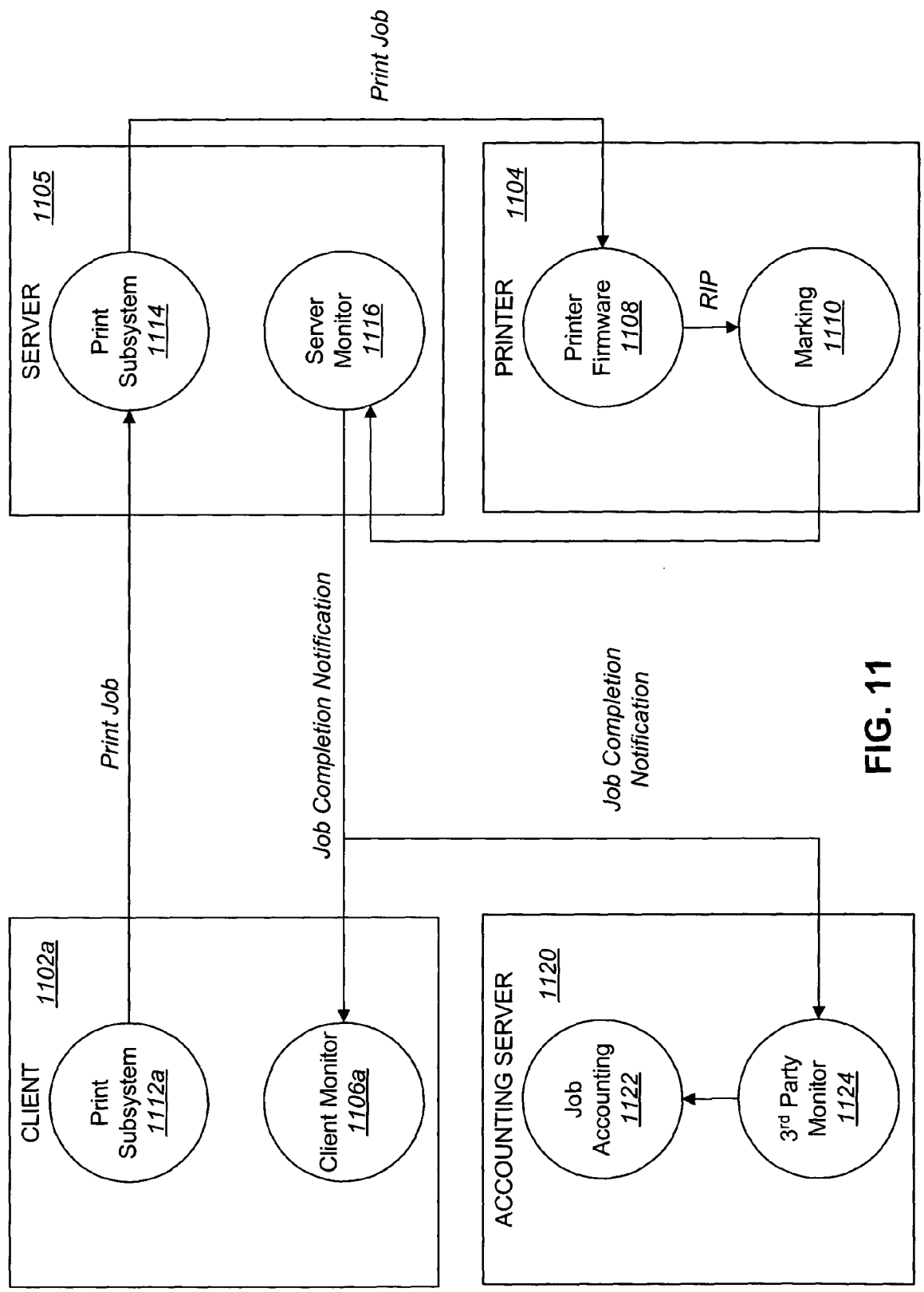
FIG. 11 is a block diagram of an embodiment of network printing (client to print server) where the job completion notification is sent to a third party system by server echo via implicit server IP address.

FIG. 11 is a block diagram of an embodiment of network printing (client to print server) where the job completion notification is sent to a third party system 1120 by server echo via implicit server IP address. In this embodiment, the server monitor 1116 identifies all third party monitors 1124 that have registered with the server monitor 1116 for the associated shared printer, and forwards a job completion notification to each third party monitor 1124. For example, the third party monitor 1124 may be part of an accounting server 1120.

Figure 12:
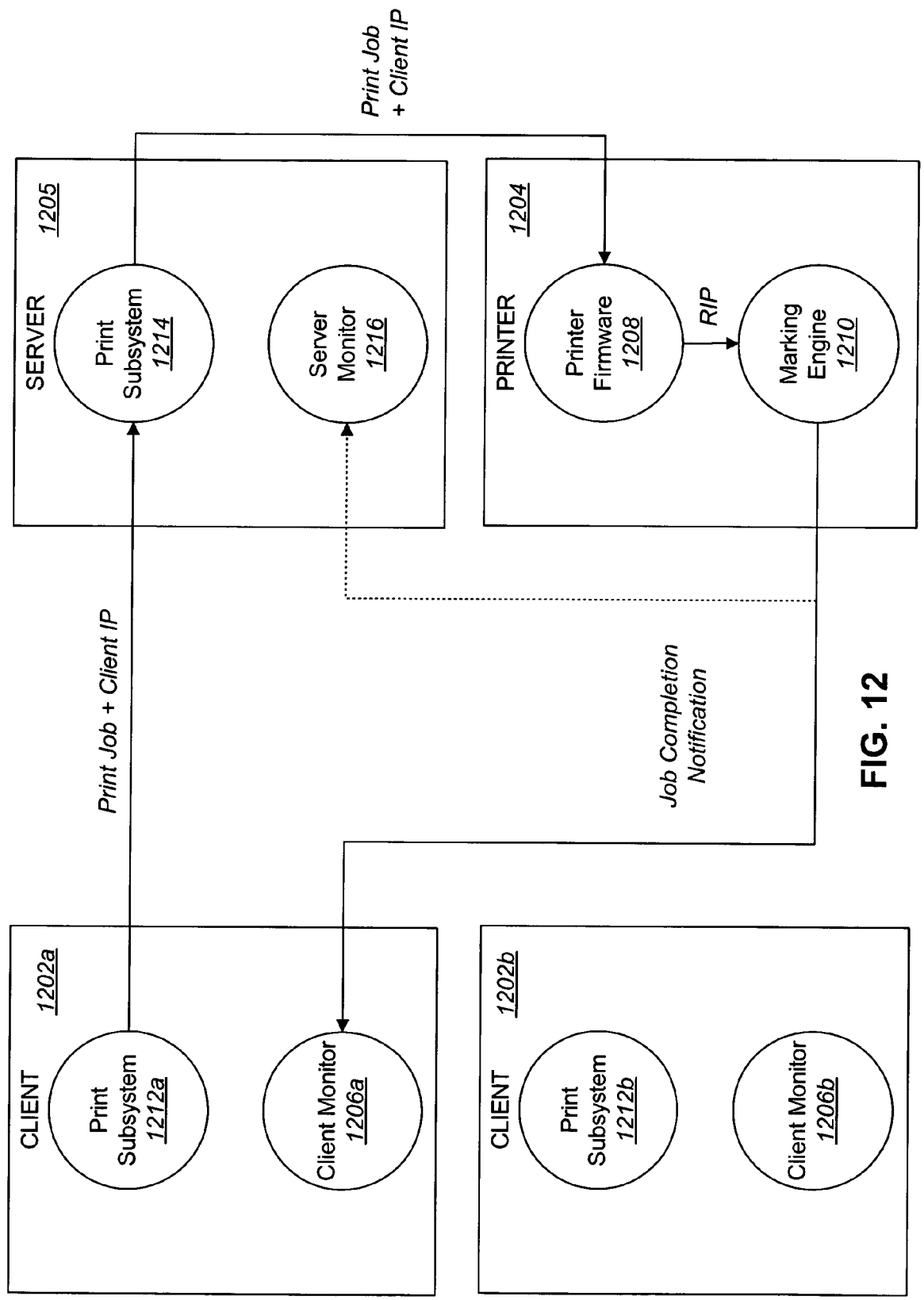
FIG. 12 is a block diagram of an embodiment that interacts with a pre-existing system that embeds the network address of the client monitor in the print job.

Referring now to FIG. 12, an embodiment is shown that interacts with a pre-existing system that embeds the network address of the client monitor 1206 in the print job. In this case, the imaging device 1204 would compare the network address embedded in the print job with the extracted network address from the transmission packets. If the two network addresses are the same (i.e., peer-peer printing), the imaging device 1204 performs its pre-existing function. In the case of the SMON® product from Sharp Corporation, the imaging device 1204 would send a job completion notification to the network address embedded in the print job using Sharp's NJR protocol.

If the network addresses are not the same (e.g., network printing), the imaging device 1204 performs its pre-existing function and optionally an additional function of sending a copy of the job completion notification to the server monitor 1216 on the print server 1205. The copied job completion notification may also contain additional information that achieves the following:

1. Identifies that the job completion notification is a duplicate.
2. Identifies the destination (e.g., name and network address) of the original job completion notification.

Upon receipt of the job completion notification, the server monitor 1216 examines the job completion notification to determine if the notification is a duplicate. If the notification is a duplicate, the server 1205 examines the job completion notification to determine the client origination, as described earlier. If the server monitor 1216 then compares the client origination to the destination of the original job completion notification. If the two are the same, the duplicate job completion notification is not forwarded; otherwise, the duplicate job completion notification is forwarded to the client monitor 1206.

Figure 13:
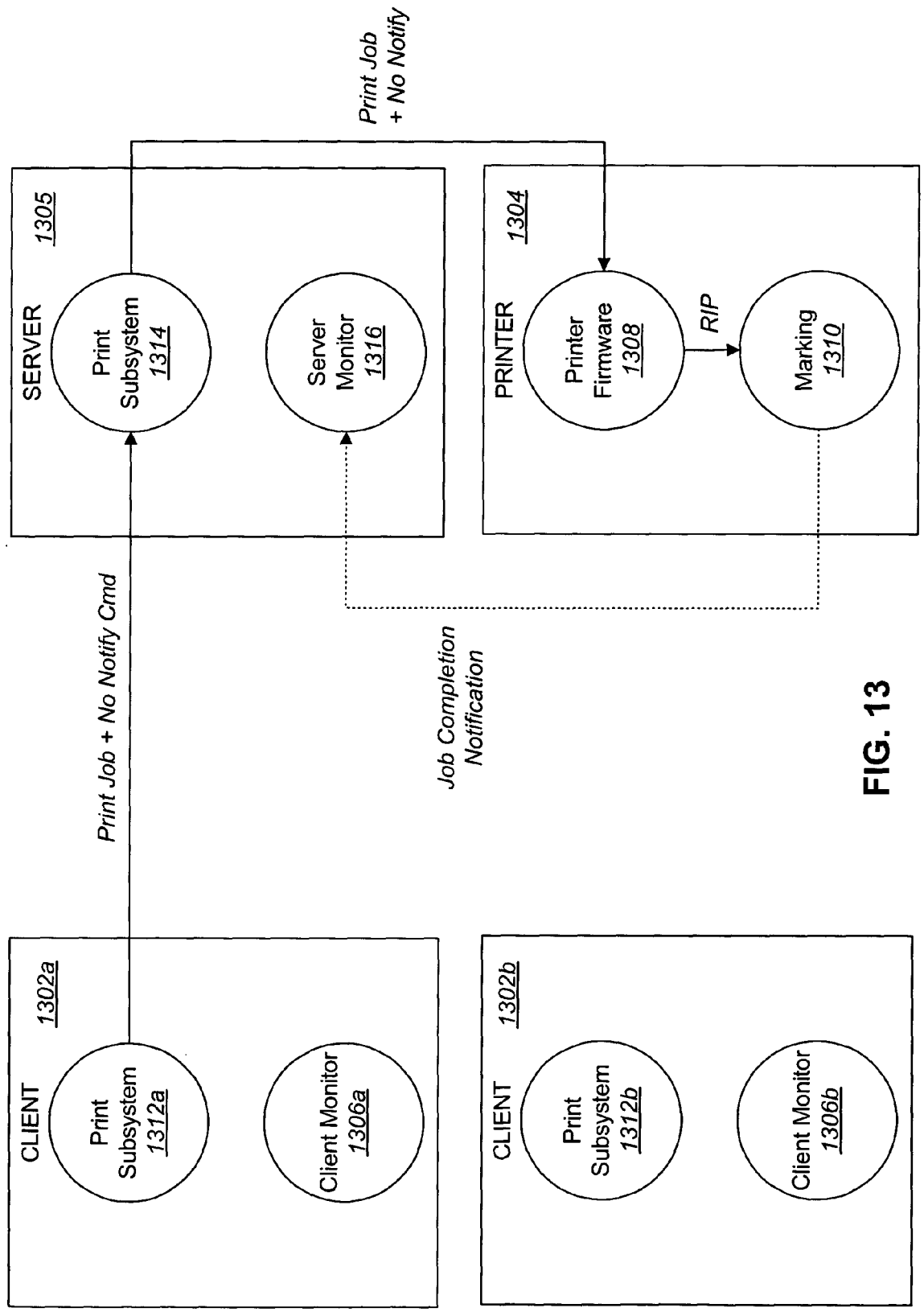
FIG. 13 is a block diagram of an embodiment that interacts with a pre-existing system that sends a no notify command with the print job.

Referring now to FIG. 13, in another case of the embodiment, the server monitor 1316 identifies all third party monitors that have registered with the server monitor 1316 for the associated shared printer, and forwards a duplicate job completion notification to each third party monitor.

In another case of this embodiment, a no notification command may be embedded in the print job that instructs the imaging device 1304 to not send job completion notifications to the client computing device 1302. In this case, the imaging device 1304 may perform its pre-existing function of not sending a job completion notification to the client 1302.

The imaging device 1304 may also include additional functionality, such as sending a non-notify job completion notification to the server monitor 1316. In this case, the imaging device 1304 would compare the network address embedded in the print job, if any, with the extracted network address from the transmission packets. If the two network addresses are the same (i.e., peer-peer printing), the imaging device 1304 would take no additional action. Otherwise, the imaging device 1304 sends the no-notify job completion notification to the server monitor 1316, as described earlier. The no-notify job completion notification may include the additional information (but not limited to) that no notification is to be forwarded to the client.

Upon receipt of the job completion notification, the server monitor 1316 examines the job completion notification to determine if the notification is a no-notify. If the notification is a no-notify, the job completion notification is not forwarded to the client origination. The server monitor 1316 though may optionally send duplicate job completion notifications to registered third party monitors.

Those skilled in the art will appreciate that the present systems and methods may be implemented in many different embodiments. Other embodiments include but are not limited to the spooling and despooling subsystems of the Apple MacIntosh operating system, the Linux operating system, System V Unix operating systems, BSD Unix operating systems, OSF Unix operating systems, Sun Solaris operating systems, HP/UX operating systems and IBM Mainframe MVS, AS/400 and OS/390 operating systems.

Although use with a printer was illustrated, it will be appreciated that the present systems and methods may be applied to other embodiments. For example, the present systems and methods may be applied to fax, scan and document operations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for monitoring an imaging job sent to an imaging device by a computer system, the method comprising:
sending an imaging job to an imaging device;
receiving the imaging job at the imaging device;
discovering an implicit network address from the imaging job without using an explicit address of a monitoring process in the imaging job, wherein the discovering comprises extracting an IP address of the computer system from the transmission of the imaging job data packets;
starting the imaging job at the imaging device;
sending a status message for the imaging job to the network address;
receiving the status message by the computer system, the status message indicating that the imaging job has been completed; and
verifying, by the computer system, that the imaging job of the status message originated on the computer system, wherein the status message is ignored if it is not verified, wherein the status message is processed if it is verified.

2. The method of claim 1, wherein the imaging device is selected from the group consisting of a printer, a scanner, a fax machine, a copier and a document server.

3. The method of claim 1, further comprising registering a client computing device with an imaging server to receive notifications regarding the imaging job.

4. The method of claim 3, wherein the imaging server is selected from the group consisting of a print server, a fax server, a scan server and a document server.

5. The method of claim 3, further comprising sending the imaging job from the client computing device to the imaging server before the imaging job is sent to the imaging device.

6. The method of claim 5, further comprising receiving the status message by the imaging server and sending the status message from the imaging server to the client computing device.

7. The method of claim 6, further comprising verifying that the imaging job of the status message originated on the client computing device.

8. The method of claim 6, further comprising verifying that the imaging job of the status message was communicated through the imaging server.

9. The method of claim 1, further comprising receiving the status message by a monitor on a client computing device.

10. The method of claim 5, further comprising receiving the status message by the imaging server and sending the status message from the imaging server to a monitor on the client computing device.

11. The method of claim 5, further comprising receiving the status message by a server monitor on the imaging server and sending the status message from the server monitor on the imaging server to a monitor on the client computing device.

12. The method of claim 3, wherein registering the client computing device with the imaging server includes providing a client computing device address to the imaging server.

13. A set of executable instructions on a computer readable medium for:
receiving an imaging job at the imaging device;
discovering an implicit network address from the imaging job without using an explicit address embedded in the imaging job, wherein the discovering comprises extracting an IP address of a sending computer system from the transmission of the imaging job data packets;

starting the imaging job at the imaging device;

sending a status message for the imaging job to the network address;

receiving the status messageby the computer system, the status message indicating that the imaging job has been completed;

verifying, by the computer system, that the imaging job of the status message originated on the computer system, wherein the status message is ignored if it is not verified, wherein the status message is processed if it is verified; and wherein the executable instructions on the computer readable medium monitor the imaging job and discover the implicit network address.

14. The set of executable instructions of claim 13, wherein the imaging device is selected from the group consisting of a printer, a scanner, a fax machine, a copier and a document server.

15. The set of executable instructions of claim 13, wherein the computer-readable medium is part of a printer.

16. The set of executable instructions of claim 13, wherein the computer-readable medium is part of a scanner.

17. The set of executable instructions of claim 13, wherein the computer-readable medium is part of a fax machine.

18. The set of executable instructions of claim 13, wherein the computer-readable medium is part of a document server.

19. An imaging system configured for monitoring an imaging job for use with an imaging device that utilizes implicit network address discovery, the imaging system comprising:

a computing device;

an imaging device in electronic communication with the computing device;

executable instructions executable on the computing device, wherein the executable instructions are configured for:

allowing a client computing device to register with the imaging system to receive notifications regarding an imaging job;

receiving the imaging job from the client computing device;

sending the imaging job to the imaging device, wherein the imaging device discovers an implicit network address from the imaging job and sends a status message for the imaging job to the network address, wherein the discovering of the implicit network address is achieved without using an explicit address in the imaging job, and wherein the discovering comprises extracting an IP address of the computing device from the transmission of the imaging job data packets;

receiving a status message from the imaging device relating to the imaging job;

using registration information to identify the client computing device;

sending the status message to the client computing device;

receiving the status message by the client computing device, the status message indicating that the imaging job has been completed; and verifying, by the client computing device, that the imaging job of the status message originated on the client computing device, wherein the status message is ignored if it is not verified, wherein the status message is processed if it is verified.

20. The imaging system of claim 19, further comprising a server monitor for receiving the status message on the imaging system and for sending the status message from the server monitor on the imaging system to a monitor on the client computing device.

21. The imaging system of claim 20, wherein the registration information includes a client computing device address.

22. A system for monitoring an imaging job and for implicit network address discovery, the system comprising:

a computing device;

an imaging device in electronic communication with the computing device;

executable instructions executable on the imaging device, wherein the executable instructions are for:

receiving the imaging job at the imaging device;

discovering an implicit network address from the imaging job without using an explicit address embedded in the imaging job, wherein the discovering comprises extracting an IP address of the computing device from the transmission of the imaging job data packets;

starting the imaging job at the imaging device;

sending a status message for the imaging job to the network address;

receiving the status message by the computing device, the status message indicating that the imaging job has been completed; and verifying, by the computing device, that the imaging job of the status message originated on the computing device, wherein the status message is ignored if it is not verified, wherein the status message is processed if it is verified.

23. The system of claim 22, further comprising an imaging server in electronic communication with the computing device and the imaging device, wherein the imaging job is sent from the computing device to the imaging server, and wherein the imaging server sends the imaging job to the imaging device.

24. The system of claim 23, wherein the imaging server is configured for:

allowing a client computing device to register with the imaging server to receive notifications regarding an imaging job;

receiving the imaging job from the client computing device;

sending the imaging job to the imaging device, wherein the imaging device discovers an implicit network address from the imaging job and sends a status message for the imaging job to the network address, wherein the discovering of the implicit network address is achieved without using an explicit address in the imaging job, and wherein the discovering comprises extracting an IP address of the imaging server from the transmission of the imaging job data packets;

receiving a status message from the imaging device relating to the imaging job;

using registration information to identify the client computing device;

sending the status message to the client computing device;

receiving the status message by the client computing device; and verifying, by the client computing device, that the imaging job of the status message originated on the computing device, wherein the status message is ignored if it is not verified, wherein the status message is processed if it is verified.

25. The system of claim 24, further comprising a server monitor for receiving the status message on the imaging server and for sending the status message from the server monitor on the imaging server to a monitor on the client computing device.

26. The system of claim 25, wherein the registration information includes a client computing device address.

* * * * *

UNITED STATES PATENT AND TRADEMARK OFFICE
CERTIFICATE OF CORRECTION

| | | |
|---|---|---|
| PATENT NO. | : 7,471,407 B2 | Page 1 of 1 |
| APPLICATION NO. | : 10/602419 | |
| DATED | : December 30, 2008 | |
| INVENTOR(S) | : Andrew R. Ferlitsch | |

It is certified that error appears in the above-identified patent and that said Letters Patent is hereby corrected as shown below:

In column 17, line 4 please replace "messageby" with --message by--.

Signed and Sealed this

Fourteenth Day of July, 2009

JOHN DOLL
*Acting Director of the United States Patent and Trademark Office*